United States Patent
Nakayama (10) Patent No.: US 7,596,768 B2
(45) Date of Patent: Sep. 29, 2009

(54) SCREENSAVER DISPLAY METHOD AND INFORMATION PROCESSING SYSTEM

(75) Inventor: Keisuke Nakayama, Tokyo (JP)

(73) Assignee: Systemneeds Inc., Tokyo (JP)

( * ) Notice: Subject to any disclaimer, the term of this patent is extended or adjusted under 35 U.S.C. 154(b) by 781 days.

(21) Appl. No.: 11/347,580

(22) Filed: Feb. 6, 2006

(65) Prior Publication Data

US 2006/0195802 A1 Aug. 31, 2006

(30) Foreign Application Priority Data

Feb. 4, 2005 (JP) ............... 2005-029786

(51) Int. Cl.
*G06F 3/048* (2006.01)
(52) U.S. Cl. ..................... 715/867; 715/827
(58) Field of Classification Search .......... 715/867, 715/827
See application file for complete search history.

(56) References Cited

U.S. PATENT DOCUMENTS 6,256,008 B1 * 7/2001 Sparks et al. ............... 345/618
6,288,715 B1 * 9/2001 Bain et al. ................... 345/211
2002/0095222 A1 * 7/2002 Lignoul ........................ 700/13

FOREIGN PATENT DOCUMENTS

JP 2001-331235 11/2001

* cited by examiner

*Primary Examiner*—Ba Huynh
*Assistant Examiner*—Shashi K Becker
(74) *Attorney, Agent, or Firm*—Jacobson Holman PLLC (57) ABSTRACT

There are provided a screensaver displaying method and an information processing system in which characters arbitrarily selected or input by a user can be displayed with a simple operation during starting of a screensaver in the screensaver started at a time when an IC card or the like is pulled out.

In the screensaver displaying method and the information processing system in which a computer is usable, while a user authentication device such as the IC card is set in a card reader and writer, and a screensaver screen is displayed and input into the computer cannot be performed, when the IC card or the like is pulled out and the user authentication device is not recognized, a control section of a processing device displays character contents set corresponding to a specific key in the screensaver screen of a display unit, when the specific key is pressed within a specific time after the IC card is pulled out.

13 Claims, 8 Drawing Sheets

DISPLAY CHARACTER SETTING TABLE

| KEY | DISPLAY CONTENTS |
|---|---|
| "1" KEY | MEETING ROOM 101 |
| "2" KEY | MEETING ROOM 201 |
| "3" KEY | MEETING ROOM 301 |
| "E" KEY | MEALTIME |
| "L" KEY | LEAVING SEAT |
| "O" KEY | OUTING |
| "S" KEY | DURING SYSTEM MAINTENANCE |
| "T" KEY | DURING TEST |
| "SPACE" KEY | DISPLAY CHARACTER INPUT DEFAULT VALUE |

FIG.3

SCREENSAVER SETTING

RETURN TO INITIAL SETTING (I)

SCREEN DISPLAY

DEFAULT DISPLAY CHARACTERS  [Win Safe ▼]
(WITHIN HALF-SIZE 30/
FULL-SIZE 15 CHARACTERS)

[ ] NOT ACCEPT ANY SHORTCUT KEY INPUT (K)

TIME BEFORE SCREENSAVER START  [3]  SECONDS (3-10 SECONDS)

DEFAULT VALUE OF DISPLAY CHARACTER
INPUT (WITHIN HALF-SIZE 30/         HH:MM TO RETURN TO OFFICE
FULL-SIZE 15 CHARACTERS)

SECURITY INFORMATION

[✓] CANCELLATION BY SAME UAD ONLY IS POSSIBLE (U)

[ ] CANCELLATION BY PRIVILEGE CARD IS POSSIBLE (T)

SHORTCUT KEY

| DISIGNATED KEY (ALPHANUMERIC CHARACTERS, F2~F9, F11~F12) | DESIGNATED CHARACTERS (WITHIN HALF-SIZE 30 / FULL-SIZE 15 CHARACTERS) |
|---|---|
| 1 | MEETING ROOM 101 |
| 2 | MEETING ROOM 201 |
| 3 | MEETING ROOM 301 |
| E | MEALTIME |
| L | LEAVING SEAT |
| O | OUTING |
| S | DURING SYSTEM MAINTENANCE |
| T | DURING TEST |
|   |   |

[OK]  [CANCEL]  [APPLY(A)]  [HELP]

FIG.4

KEY SETTING OF SCREENSAVER CHARACTER DISPLAY

PRESS KEY SET TO "CHARACTERS TO BE DISPLAYED IN SCREENSAVER".
TO INPUT CHARACTERS TO BE DISPLAYED, PRESS [SPACE] KEY.

WHEN ANOTHER KEY IS PRESSED, DEFAULT CHARACTERS SET IN "WinSafe SCREENSAVER SETTING" SCREEN ARE DISPLAYED

| KEY | CHARACTERS TO BE DISPLAYED IN SCREENSAVER |
|---|---|
| 1 | MEETING ROOM 101 |
| 2 | MEETING ROOM 201 |
| 3 | MEETING ROOM 301 |
| E | MEALTIME |
| L | LEAVING SEAT |
| O | OUTING |
| S | DURING SYSTEM MAINTENANCE |
| T | DURING TEST |
| KEY OTHER THAN ABOVE KEYS | WinSafe VETM |

SCREENSAVER DISPLAY METHOD AND INFORMATION PROCESSING SYSTEM

BACKGROUND OF THE INVENTION

1. Field of the Invention

The present invention relates to a method of displaying a screensaver, more particularly to a screensaver displaying method and an information processing system in which characters designated by a user are displayed to impart a message to the screensaver in a screensaver lock display screen started at a time when a user authentication device (UAD) such as an IC card is pulled out.

2. Description of the Related Art

In a personal computer (PC), there is well known a screensaver operated in a case where there is not any input from an input device such as a keyboard or a mouse for a specific time in order to prevent a screen from being burnt.

Moreover, in recent years, in order to reinforce security, the personal computer can be operated only in a case where a true IC card is inserted into a card reader and writer of the IC card connected to the personal computer. When the IC card is pulled out, the screensaver is started. When the true IC card is inserted again, the personal computer can be operated. This is a so-called screensaver locking technology. That is, in a case where the IC card has been pulled out, a screen of the screensaver is displayed, and an operation of the personal computer is locked.

It is to be noted that there is sometimes used a universal serial bus (USB) token insertable directly into a USB of the personal computer instead of the IC card.

As a prior-art screensaver for the above-described reinforcement of the security, there is "Information Processing Device" disclosed in Japanese Patent Application Laid-Open No. 2001-331235 published on Nov. 30, 2001.

However, in the conventional screensaver prevented from being burnt, and the screensaver associated with the security, preparations are laborious in order to display characters and the like in the screensaver display screen. Especially, in the screensaver screen displayed after the IC card is pulled out, it is not possible to display, with a simple operation, characters or the like indicating a destination or the like, characters or the like indicating a time to return to the office or the like, or characters or the like indicating a personal computer status or the like, and there is also a problem that any message for people around a user is not effectively utilized.

SUMMARY OF THE INVENTION

The present invention has been developed in view of the above-described circumstances, and an object thereof is to provide a screensaver displaying method and an information processing system in which characters arbitrarily selected or input by a user can be displayed with a simple operation during starting of the screensaver in the screensaver started at a time when an IC card or the like is pulled out. Accordingly, the third party can be easily informed of user's destination, time to return to the office, personal computer status and the like, and user's convenience can be improved.

Moreover, an object of the present invention is to provide a screensaver displaying method and an information processing system in which input locking is realized by a screensaver, when an IC card or the like is pulled out. When the IC card or the like is inserted, it is judged whether or not the locking of the screensaver can be cancelled. When it is possible to cancel the locking, a password input screen is displayed. Accordingly, security in a computer can be improved. Moreover, the locking of the screensaver can be smoothly cancelled.

The present invention is a screensaver displaying method for displaying a screensaver in a display unit of a processing device to lock processing in the processing device, when connection to a user authentication device is not recognized, the method comprising the step of displaying character contents corresponding to a preset key in a screensaver screen, when the preset key is input within a specific time after the connection to the user authentication device is not recognized. Since the preset character contents are displayed in a screensaver screen, a user can be specified to transmit the message to people around the user, and space and paper savings can be effectively realized.

The present invention is a screensaver displaying method for displaying a screensaver in a display unit of a processing device to lock processing in the processing device, when connection to a user authentication device is not recognized, the method comprising the steps of displaying a screen in which input of arbitrary characters is possible, when a preset specific key is input within a specific time after the connection to the user authentication device is not recognized; and displaying contents of the characters in a screensaver screen, when the input characters are defined in the screen. There are effects that the arbitrarily input character contents can be displayed in the screensaver screen to specify a user and transmit the message to people around the user and that space and paper savings can be realized.

The present invention is the screensaver displaying method further comprising the steps of judging from identification information of the user authentication device whether or not cancellation of a screensaver display is possible, when the connection to the user authentication device is recognized; displaying a password input screen in a case where the cancellation is possible; and canceling the screensaver display and resetting to the screen before the locking of the screensaver in the processing device, when an appropriate password is input. Therefore, there is an effect that reset processing can be smoothly performed.

The present invention is an information processing system for monitoring a user authentication device, and displaying a screensaver in a display unit of a processing device to lock processing in the processing device, when connection to the user authentication device is not recognized, the system comprising: a control section in which a plurality of specific keys and character contents are associated and stored beforehand in a table and which displays the corresponding character contents in a screensaver screen of the display unit with reference to the table, when any of the specific keys is selected and input within a specific time after the connection to the user authentication device is not recognized. There are effects that the preset character contents can be displayed in the screensaver screen to specify a user and transmit a message to people around the user and that space and paper savings can be realized.

The present invention is the information processing system wherein the control section: predetermines the specific key for displaying a screen in which input of arbitrary characters is possible; displays in the display unit the screen in which the input of the arbitrary characters is input, when the specific key is input within the specific time after the connection to the user authentication device is not recognized; and displays contents of the characters in a screensaver screen, when the input characters are defined in the screen. Therefore, there are effects that the arbitrarily input character contents can be displayed in the screensaver screen to specify a user and transmit a message to people around the user and that space and paper savings can be realized.

The present invention is the information processing system wherein the control-section: judges from identification information of the user authentication device whether or not cancellation of a screensaver display is possible, when the connection to the user authentication device is recognized; displays a password input screen in the display unit in a case where the cancellation is possible; judges whether or not an input password is appropriate; and cancels the screensaver display and resets to the screen before the locking of the screensaver in the processing device, when the password is appropriate. In consequence, there is an effect that reset processing can be smoothly performed.

DESCRIPTION OF REFERENCE NUMERALS

1 . . . server, 2 . . . database, 3 . . . IC card, 10 . . . processing device, 11 . . . control section, 12 . . . main memory, 13 . . . storage section, 14 . . . interface, 20 . . . display unit, 30 . . . card reader and writer, 40 . . . keyboard, and 50 . . . network.

DESCRIPTION OF THE PREFERRED EMBODIMENT

An embodiment of the present invention will be described with reference to the drawings.

In an information processing system of the embodiment of the present invention, a computer is usable in a state in which a device (user authentication device: UAD) such as an IC card is set in a read device such as a card reader and writer. When the IC card or the like is pulled out, and connection (including not only physical connection but also radio communication connection) to the user authentication device is not recognized, a screensaver screen is displayed, and input to the computer cannot be performed. In this system, when a specific key is pressed within a specific time after the IC card is pulled out, set specific characters corresponding to the key are displayed in the screensaver screen. Accordingly, when a user pulls out the IC card to display the screensaver screen, characters selected from the set characters, or arbitrarily input characters can be displayed. The user can be specified to transmit, to people around the user, information such as a destination, a time to return to the office, and a computer status, and space and paper savings can be realized.

[Summary of the Present System]

Figure 1:
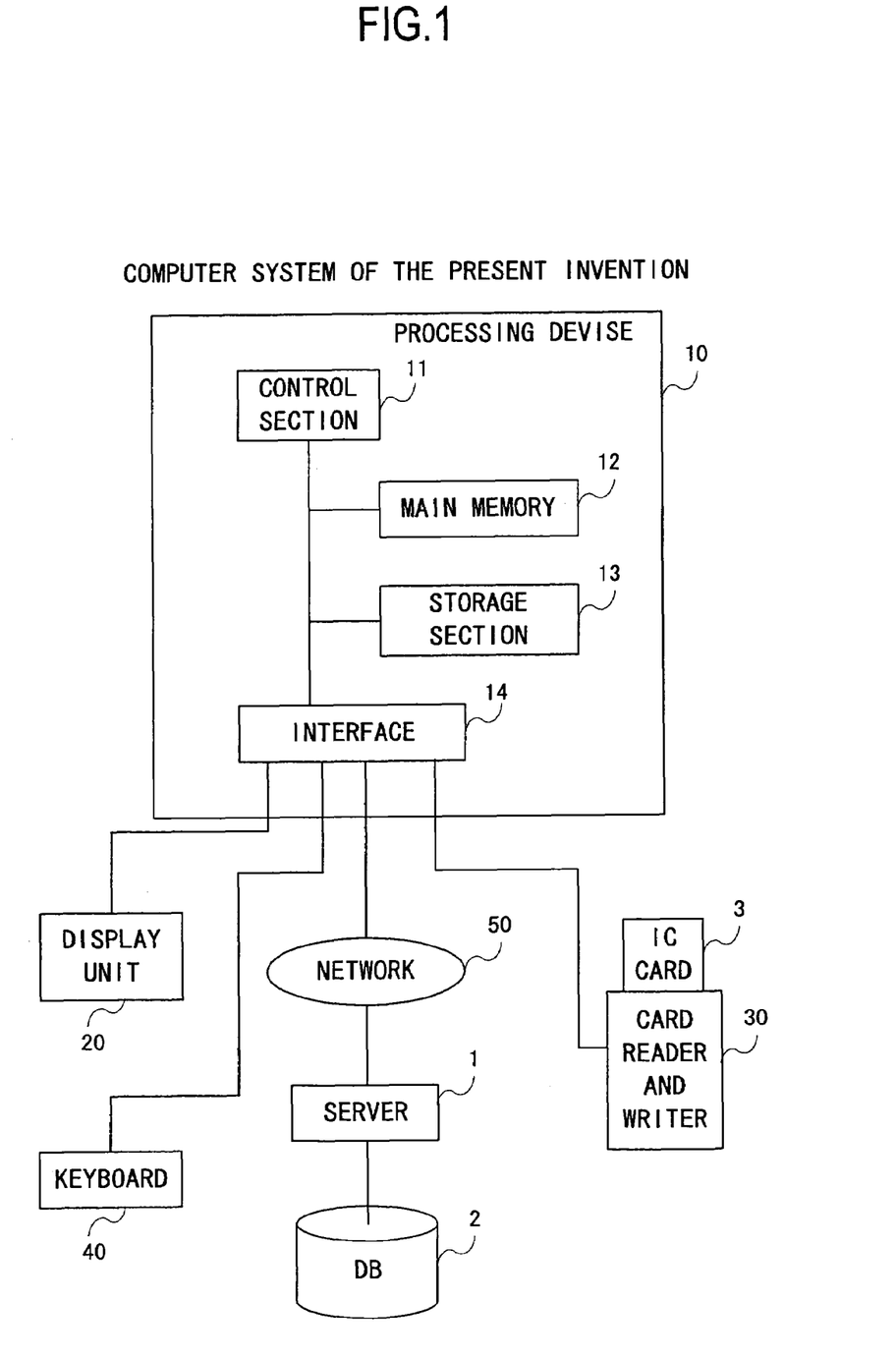
FIG. 1 is a constitution block diagram of an information processing system in an embodiment of the present invention.

There will be described an information processing system (computer system) in an embodiment of the present invention with reference to FIG. 1. FIG. 1 is a constitution block diagram of the information processing system in the embodiment of the present invention.

In the information processing system (the present system) of the embodiment of the present invention, as shown in FIG. 1, a processing device 10 is connected to a server 1 via a network 50, and the processing device 10 is connected to a display unit 20, a card reader and writer 30, and a keyboard 40.

Moreover, the server 1 is connected to a database 2.

[Components of the Present System]

Components of the present system will be described specifically.

[Processing Device 10]

A processing device 10 includes: a control section 11 realized by a central processing unit; a main memory 12 temporarily loaded with a program to operate; a storage section 13 which stores various types of processing programs, data, tables and the like; an interface 14 for connection to an external device and the network.

The interface 14 is originally disposed for each external device, but FIG. 1 shows one representative interface to simplify description.

The control section 11 reads the processing program from the storage section 13, and loads the program in the main memory 12 so that the processing program can be operated.

Means realized by the control section 11 are mainly monitor processing means, pre-screensaver, screensaver, and screensaver setting manager.

The respective means will be described in detail.

The main memory 12 is a memory which temporarily stores the program and the data for execution of the program.

The storage section 13 is constituted of a hard disk and the like, and stores various types of processing programs, data, and tables.

Especially in the storage section 13, a display character setting table is stored in which characters to be displayed in a screensaver display screen are preset.

In the above example, the display character setting table is stored in the storage section 13 of the processing device 10, but the table may be stored in the DB 2, and accessed by the processing device 10 via the network 50 and the server 1.

[Display Character Setting Table]

Figure 2:
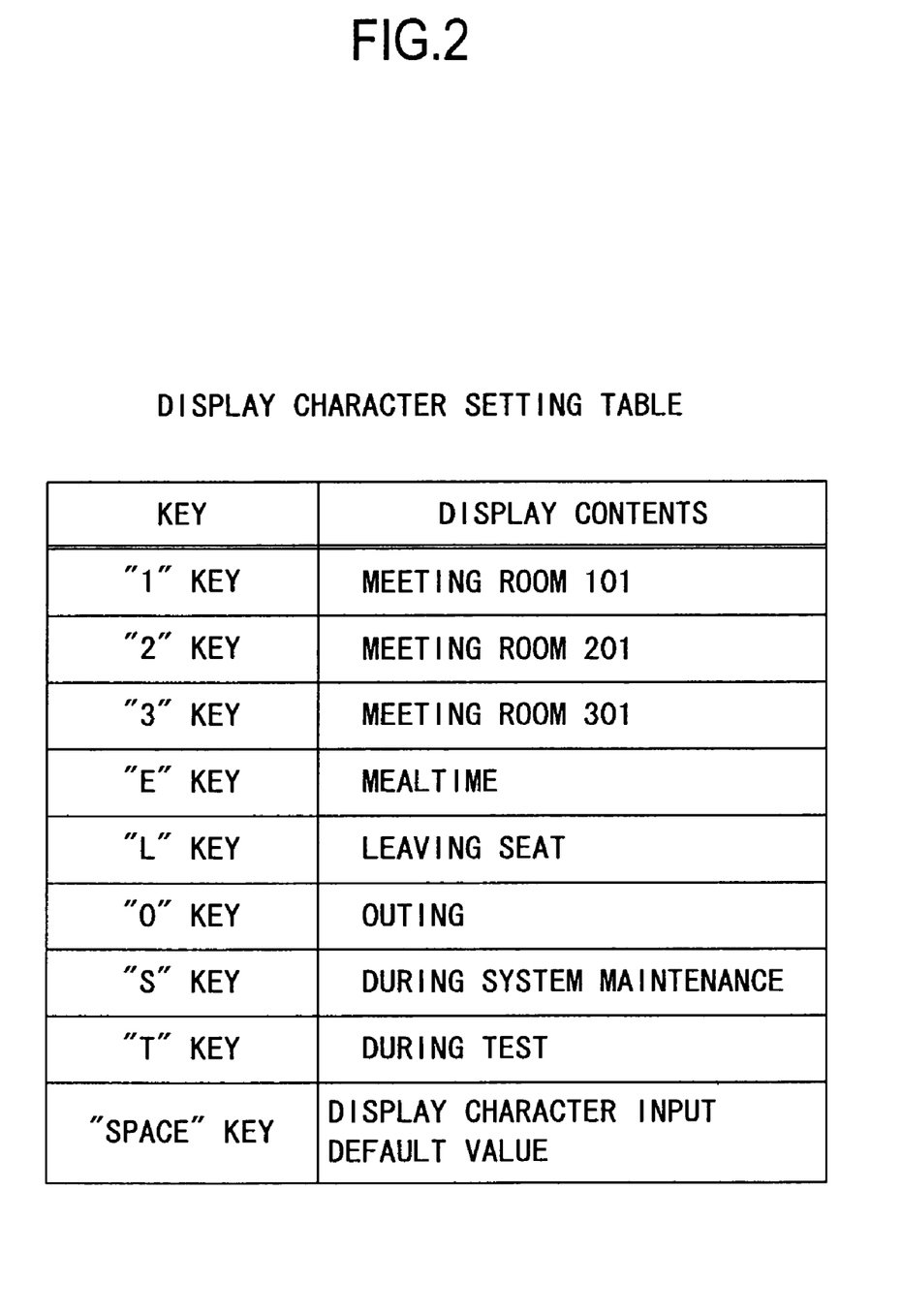
FIG. 2 is a schematic diagram of a display character setting table.

A display character setting table will be described with reference to FIG. 2. FIG. 2 is a schematic diagram of the display character setting table.

As shown in FIG. 2, in the display character setting table, keys and display contents are associated with each other and stored. For example, there are stored "meeting room 101" corresponding to numeric key "1", and "mealtime" corresponding to character key "E".

When an IC card 3 is pulled out of the card reader and writer 30 to operate the pre-screensaver, and the key is pressed within a specific time (settable by the screensaver setting manager), the corresponding characters are displayed in the screensaver display screen.

It is to be noted that a default value (default characters) set by the screensaver setting manager is displayed with respect to a "space" key, and the default characters can be overwritten.

[Display Unit 20]

The display unit 20 displays a screensaver screen, and displays the set characters corresponding to the key in the screensaver screen, when a user inputs the key from the keyboard 40 within the specific time.

[Card Reader and Writer 30]

The card reader and writer 30 reads information of the IC card 3, and writes the information in the IC card 3. That is, the card reader and writer is an input and output device which inputs and outputs the data to a user authentication device such as the IC card.

There will be described later the processing between the IC card 3 and the processing device 10.

Instead of the IC card 3, a USB token may be used which is directly connected to a USB port.

[Keyboard 40]

The keyboard 40 is an input device which performs input into the processing device 10. Especially, when the IC card 3 is pulled out of the card reader and writer 30 to operate the pre-screensaver, and the key registered in the display character setting table is pressed within a specific time, the corresponding characters are displayed in the screensaver display screen.

[Server 1]

The server 1 is connected to the processing device 10 via the network 50, and is also connected to the database (DB) 2.

In FIG. 1, the server 1 is connected to the processing device 10 in order to simplify the description, but in actual, the server 1 is connected to a plurality of processing devices 10.

The server 1 manages the DB 2, stores user's information of the processing device 10 in the DB 2, and also stores user's history information such as log-in and log-out in the DB 2.

It is to be noted that in a case where the display character setting table is stored in the DB 2, the processing of the present invention is substantially performed by the server 1, the processing device 10 receives the data from the server 1 to display the data in the display unit 20, and the data is input from an input unit such as the keyboard 40, and transmitted to the server 1.

[IC Card 3]

The IC card 3 is a user authentication device in which at least an identifier is stored. As the user authentication device, there is supposed a device which authenticates physical characteristics such as fingerprints. Instead of the authentication device, there may be used a device which simply hooks the screensaver (pre-screensaver).

[Log-in Processing]

There will be described log-in processing into an operating system (OS) in the present system.

When a power supply of the processing device 10 as a computer is turned on, the OS starts. A user authentication program operates before the system operates. The control section 11 judges whether or not the IC card 3 is inserted in the card reader and writer 30. When the IC card 3 is not inserted, the control section prompts the user to set the IC card 3 in the card reader and writer 30 in the display screen of the display unit 20.

When the IC card 3 is set in the card reader and writer 30, the input of a password is prompted in the display screen of the display unit 20. When there is an input of password, it is judged whether or not the password is appropriate with respect to identification information of the IC card 3. When the password is appropriate, log-in is permitted.

A previous log-out time is stored in addition to the identification information in the IC card 3. The same time is stored in the storage section 13 of the processing device 10. It is checked in the user authentication program whether or not the times agree with each other. When they do not agree with each other, it is judged that the IC card 3 is a counterfeit card, and the log-in is not permitted.

In the above example, the processing device 10 performs the log-in processing. However, necessary data may be stored in the DB 2, and the log-in processing may be subject performed by the server 1.

[Screensaver Lock Processing]

Next, screensaver lock processing will be described.

When the user pulls the IC card 3 out of the card reader and writer 30 to leave their seat in the log-in state, the time is stored momentarily in the IC card 3, and also stored in the processing device 10.

Furthermore, when the key set to the display character setting table is input from the keyboard 40 within a specific time, the corresponding display contents set to the display character setting table are displayed in the screensaver screen.

Unless the setting key is input within the specific time, default display characters set by the screensaver setting manager are displayed in the screensaver screen.

Moreover, in a case where the user forgets the correspondence between the setting key and the display contents, an escape (Esc) key is pressed. Then, it is possible to refer to the correspondence between the setting key and the characters to be displayed in the screensaver. When the setting key is pressed within another specific time after displaying the correspondence in the screen, the corresponding display contents are displayed.

Figure 4:
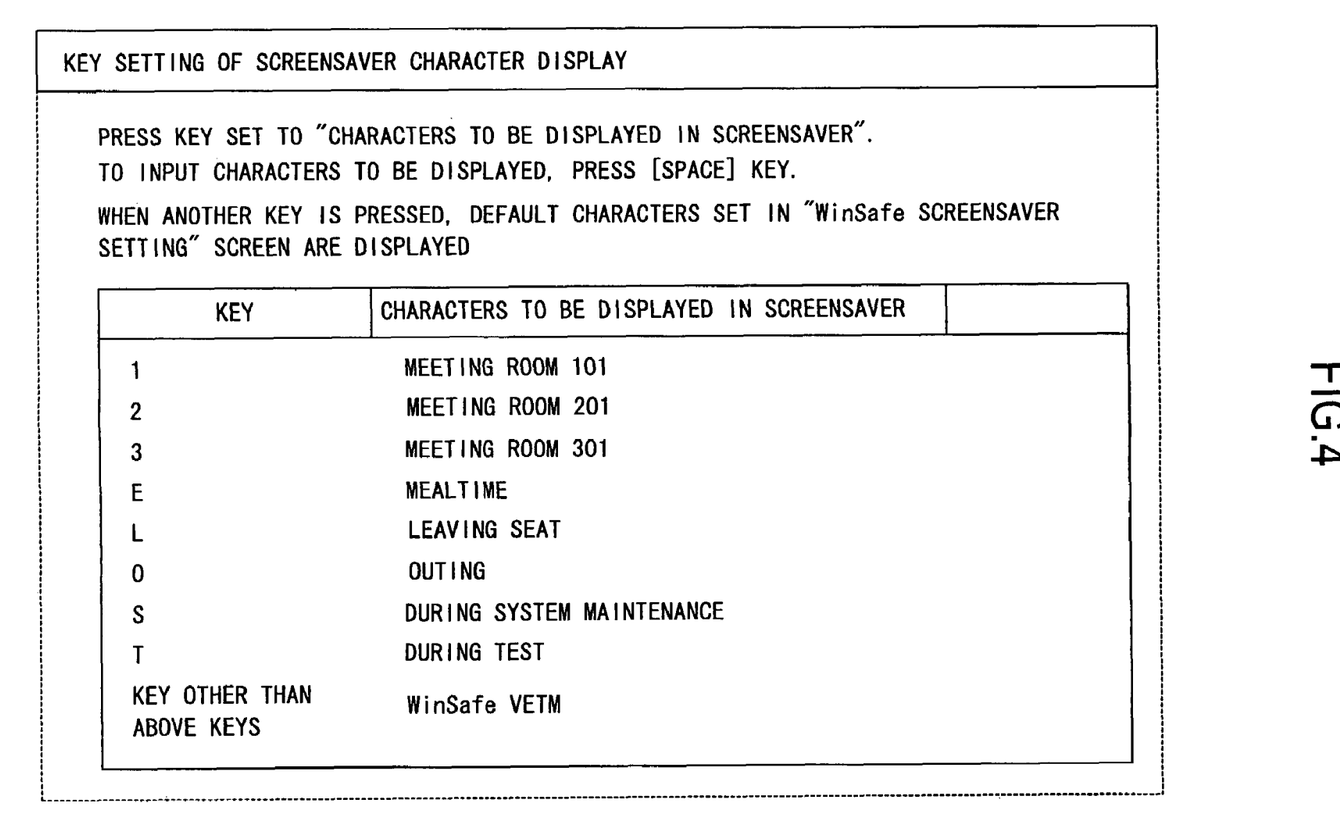
FIG. 4 is a schematic diagram of a screen which displays a correspondence between keys and characters to be displayed in a screensaver.

FIG. 4 shows a screen indicating the correspondence between the setting keys and the characters to be displayed in the screensaver. FIG. 4 is a schematic diagram of the screen which displays the correspondence between the keys and the characters to be displayed in the screensaver.

An indicator is disposed under the screen of FIG. 4. The key input is accepted within a time until graduations of the indicator are full. The key input is not accepted overtime, and the default display characters are displayed in the screensaver screen.

Moreover, in a case where the "space" key is pressed within a specific time after the IC card 3 is pulled out of the card reader and writer 30, there is displayed a default value of display character input set by the screensaver setting manager. The default value is displayed in an overwrite mode. Therefore, if an input is made in a necessary position, the default value can be utilized.

For example, in a case where the default value is "HH:MM to return to the office", when the first "HH:MM" is changed, "to return to the office" is usable as it is.

Figure 5:
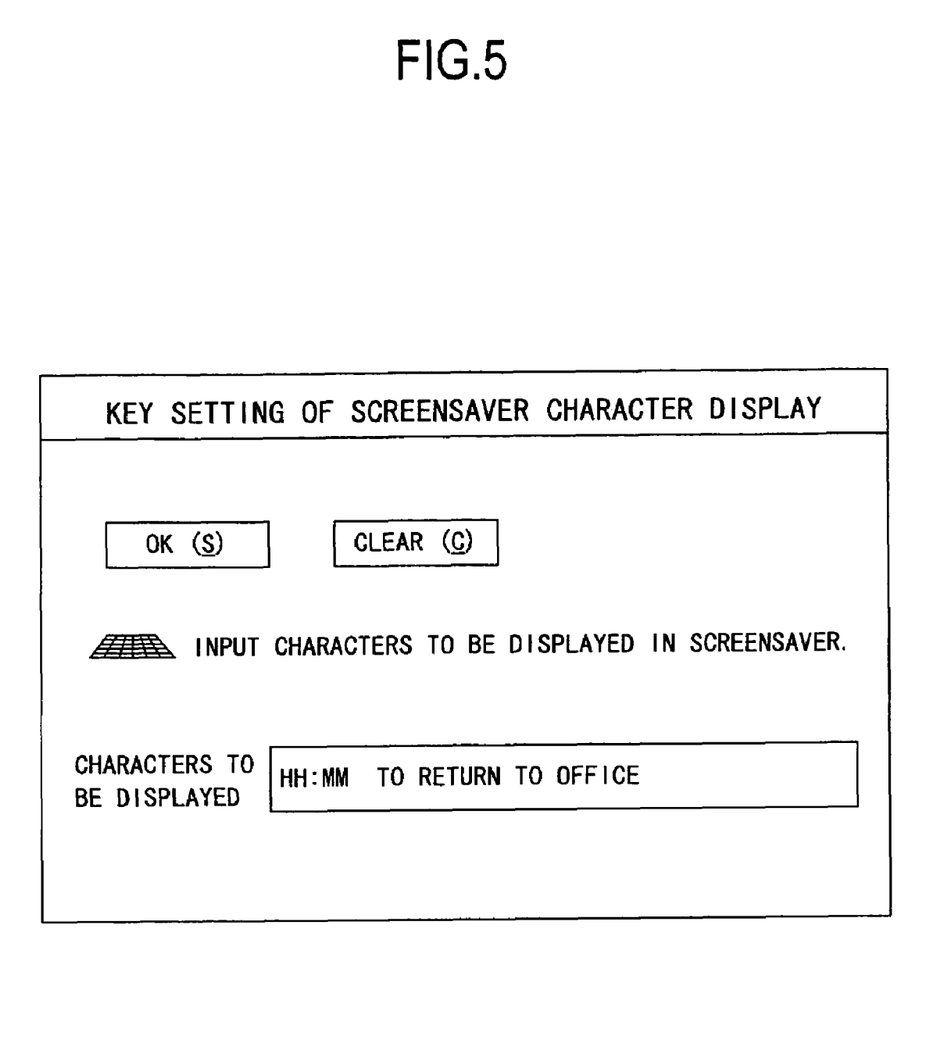
FIG. 5 is a schematic diagram of a screen displayed by depressing a space key.

FIG. 5 shows a screen displayed by pressing the "space" key. FIG. 5 is a schematic diagram of the screen displayed by depressing the space key.

There is not any restriction on the time in the display screen of FIG. 5. The characters can be input until the characters are defined with an "enter" key.

When the characters are input, and the "enter" key is input, the input characters are displayed in the screensaver screen.

As described above, the screensaver screen is displayed to lock the processing of the processing device 10.

In the above example, the processing device 10 performs the screensaver lock processing, but the necessary data may be stored in the DB 2 so that the server 1 substantially performs the screensaver lock processing.

[Screensaver Cancellation Processing]

In screensaver cancellation processing, in a case where the user returns to their seat, and inserts the IC card 3 into the card reader and writer 30, identification information and time information (time information on a time when the card is pulled out) of the IC card 3 are read, and it is judged whether or not the IC card 3 can cancel the screensaver.

In the screensaver cancellation, on set conditions that the screensaver cannot be cancelled unless the IC card 3 is the same as that during the locking of the screensaver, when the identification information and the time information of the IC card 3 do not agree with those of the IC card stored in the storage section 13 of the processing device 10, the screensaver cancellation is rejected.

Moreover, on set conditions that the screensaver can be cancelled even with a privilege IC card, the identification information of the privilege IC card is read. When the information is compared with the identification information of the privilege IC card preset in the processing device 10 to judge that the inserted IC card is the privilege IC card, it is judged the IC card can cancel the screensaver.

Moreover, when the IC card 3 can cancel the screensaver, a screen is displayed to urge the password input in the display screen of the display unit 20. When an appropriate password is input, the screensaver is cancelled to reset to the screen before the locking of the screensaver. That is, the processing in the processing device 10 is reset. Unless the appropriate password is input, the screensaver is not cancelled.

In the above example, the screensaver cancellation processing is performed by the processing device 10, but the necessary data may be stored in the DB 2 so that the server 1 substantially performs the screensaver cancellation processing.

[Screensaver Setting Manager]

Next, the screensaver setting manager will be described as means to be realized by the control section 11 to execute the processing program stored in the storage section 13 of the processing device 10.

The screensaver setting manager has a function of registering the keys and the display characters in the display character setting table of FIG. 2, specifying the default display characters (character contents displayed at a time when the setting key is not pressed within the specific time), setting a time up to screensaver start, and setting the default value (character contents displayed at a time when the user overwrites and inputs the arbitrary characters) of the display character input. Furthermore, setting that does not accept any shortcut key input is also possible. Security information may be set such that the screensaver can be cancelled by the same UAD only or by the privilege card.

The set contents are stored in the storage section 13.

It is to be noted that the set contents may be stored in the DB 2. In this case, the server 1 may execute the processing of the screensaver setting manager.

Figure 3:
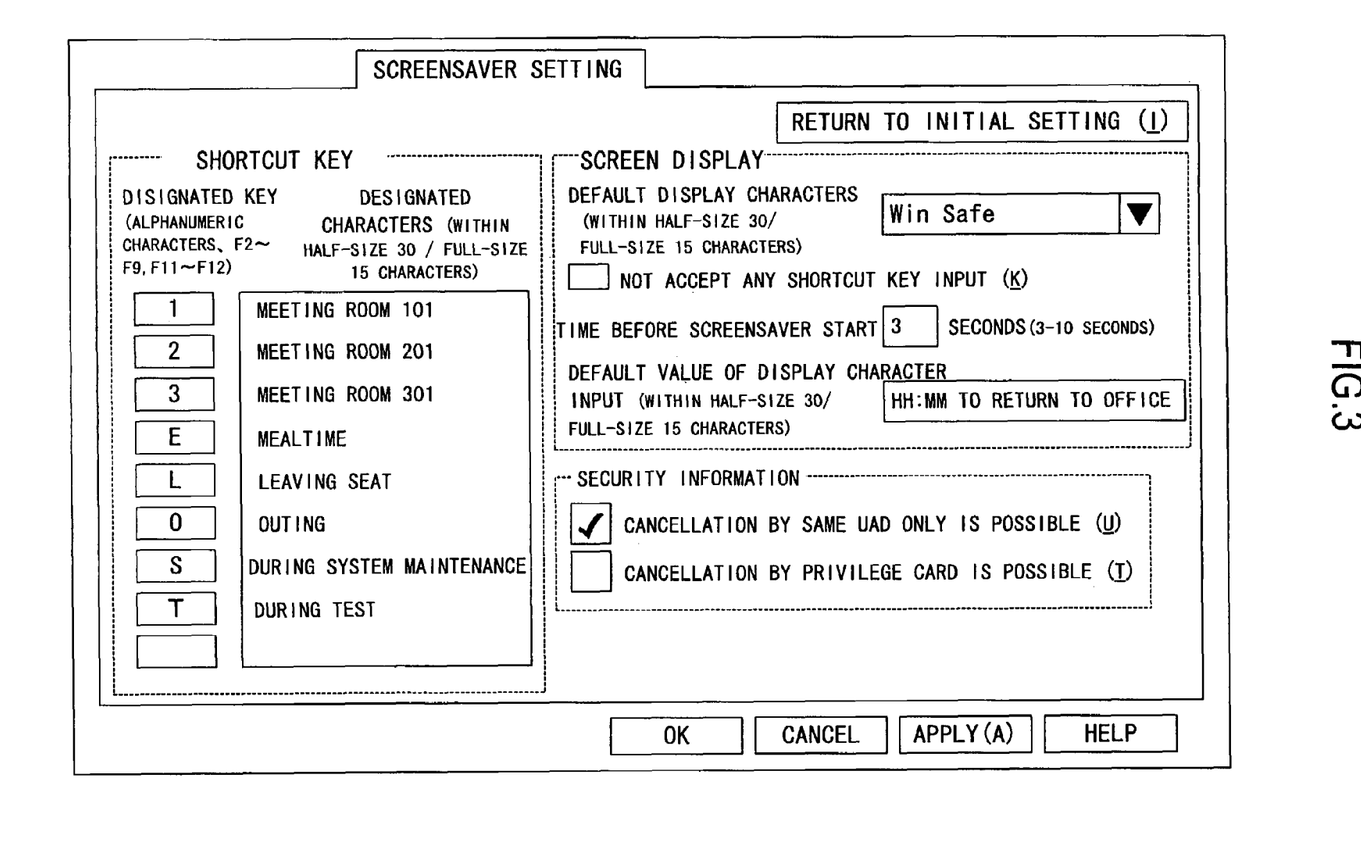
FIG. 3 is a schematic diagram of a screensaver setting screen.

FIG. 3 shows a display screen for performing the setting in the screensaver setting manager. FIG. 3 is a schematic diagram of a screensaver setting screen.

As shown in FIG. 3, on the left side of the screen, it is possible to input shortcut keys and display contents to be set to the display character setting table. On an upper right side of the screen, it is possible to input screen displays such as default display characters, acceptance of the shortcut key, screensaver start time, and default value of the display character input. On a lower right side of the screen, it is possible to set the screensaver cancellation conditions as security information.

[Monitor Processing Means]

Next, there will be described the monitor processing means, pre-screensaver, and screensaver as means to be realized by the control section 11 to execute the processing program stored in the storage section 13 of the processing device 10. There will be described processing to be executed by each means.

Figure 6:
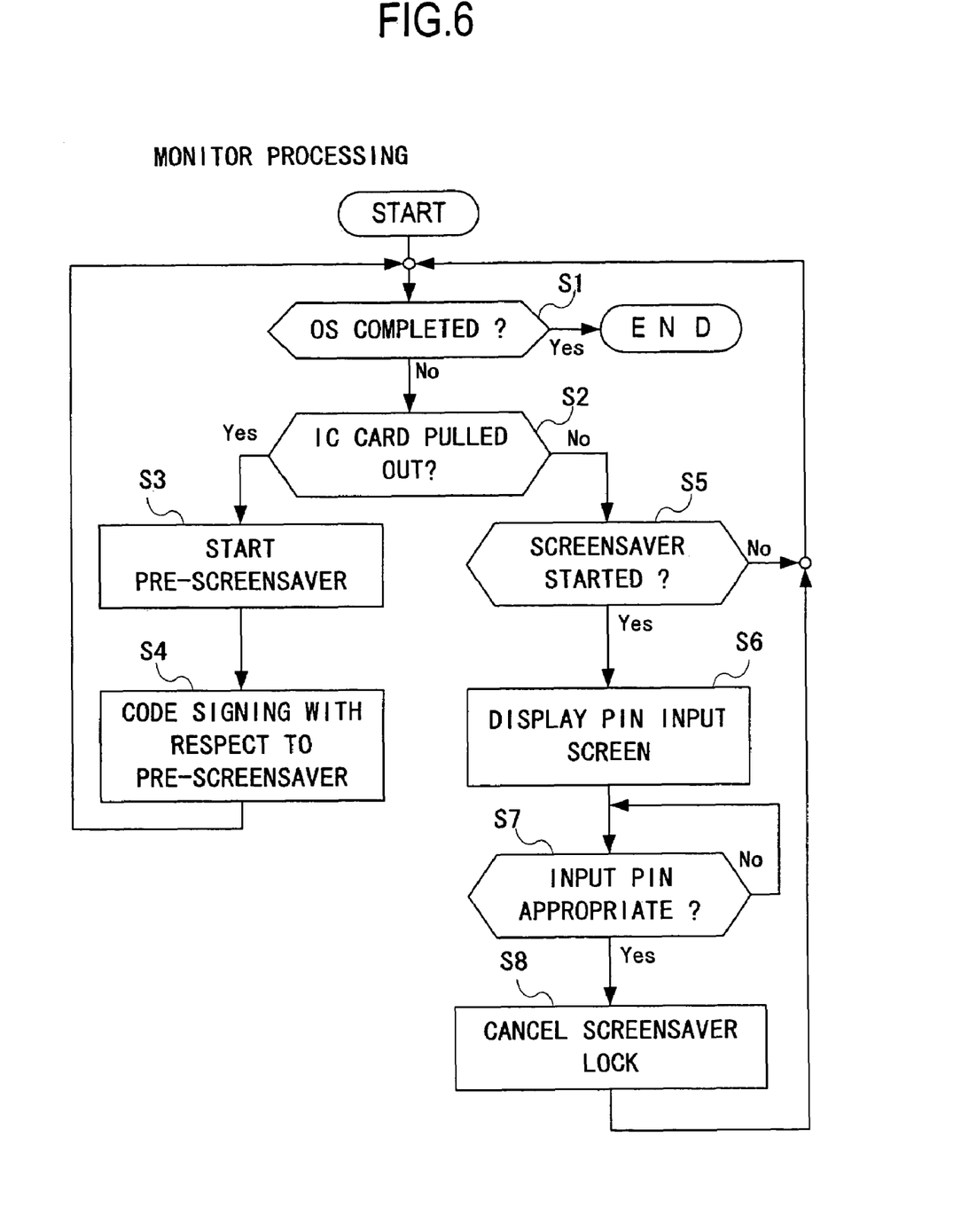
FIG. 6 is a flowchart of monitor processing.

There will be described monitor processing in the monitor processing means realized by the execution of the control section 11 with reference to FIG. 6. FIG. 6 is a flowchart of the monitor processing.

First, the monitor processing means constantly monitors completion of OS and an attached or detached state of the IC card in the card reader and writer 30.

The monitor means judges whether or not the OS is completed (S1). When the OS is completed (Yes in the step), the processing is ended.

Moreover, when the OS is not completed (No in the step), it is judged whether or not the inserted IC card 3 is pulled out (S2). This is because it is presumed that the IC card 3 is inserted.

When the IC card 3 is pulled out in the processing S2 (Yes), next the pre-screensaver is started (S3).

Moreover, code signing is performed with respect to the pre-screensaver (S4). In this code signing, an encryption key is held in the pre-screensaver, and corresponding decryption key is held in the monitor processing means. When the monitor processing means issues a random number to the pre-screensaver, the pre-screensaver encrypts the random number with the encryption key to return the number to the monitor processing means. Then, the monitor processing means decodes the encrypted random number with the decryption key. When the issued random number agrees with the decoded random number, it is recognized that an appropriate pre-screensaver is operating.

Here, when the issued random number does not agree with the decoded random number, it is judged that the appropriate pre-screensaver is not operating. The screensaver is started to perform the code signing, and usual screensaver lock processing is performed.

When the code signing is normally performed in the processing S4, the pre-screensaver and the screensaver operate to change the display screen into the screensaver screen, and the screensaver is locked. Subsequently, the monitor processing means judges whether or not the OS is completed and whether or not the IC card 3 has been pulled out of the card reader and writer 30 (S2).

Moreover, when the IC card 3 is not pulled out of the card reader and writer 30, and is inserted (No), the monitor processing means judges whether or not the screensaver is starting (S5).

When the screensaver is not started (No), the processing returns to the processing S1.

Moreover, when the screensaver is started (Yes), the monitor processing means displays a personal identification number (PIN) input screen (S6), and judges whether or not the input PIN is appropriate (S7).

When the input PIN is not appropriate (No), the PIN input is urged again.

When the input PIN is appropriate (Yes), the screensaver locking is cancelled (S8), and the display screen returns to that before the screensaver locking, thereby returning to the processing S1.

[Pre-screensaver]

Figure 7:
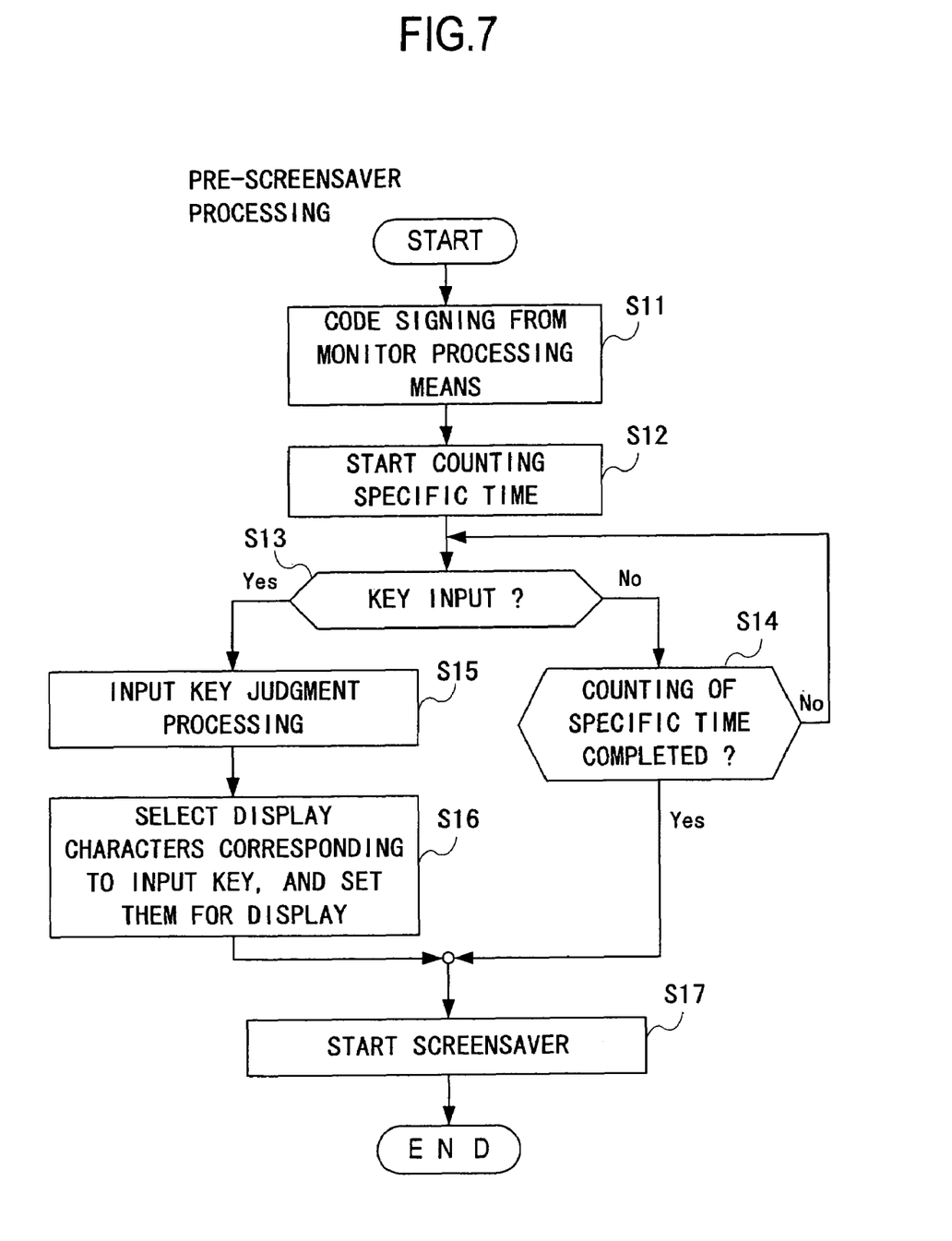
FIG. 7 is a flowchart of pre-screensaver processing.

There will be described pre-screensaver processing in the pre-screensaver realized by the execution of the control section 11 with reference to FIG. 7. FIG. 7 is a flowchart of the pre-screensaver processing.

When the pre-screensaver is started from the monitor processing means, the code signing is performed from the monitor processing means (S11). The above-described processing is performed in the code signing.

When the code signing is normally performed, the specific time starts to be counted by use of a timer disposed in the control section 11 (S12). The specific time is set by the screensaver setting manager.

Moreover, it is judged whether or not there is a set key input (S13). When there is not any key input (No), it is judged whether or not the counting of the specific time is completed (S14). When the counting is not completed (No), the processing returns to the judgment of the key input of S13.

When the counting of the specific time is completed in the judgment processing S14 (Yes), the screensaver is started (S17), thereby ending the processing.

When there is the key input set in the processing S13 (Yes), input key judgment processing is performed (S15). Moreover, the display characters corresponding to the judged input key are selected with reference to the display character setting table, and the characters are set for display (S16).

When the input key is an "escape" key, the screen shown in FIG. 4 is displayed, and the key input is waited for within another specific time to shift to the processing S16.

Moreover, when the input key is a "space" key, the screen shown in FIG. 5 is displayed. The default value of the display character input is overwritten and input, the input defined characters are set for the display, and the processing shifts to S17.

Furthermore, the screensaver is started, and the screensaver screen is displayed by use of the display characters set for the display or the default display characters.

[Screensaver]

Figure 8:
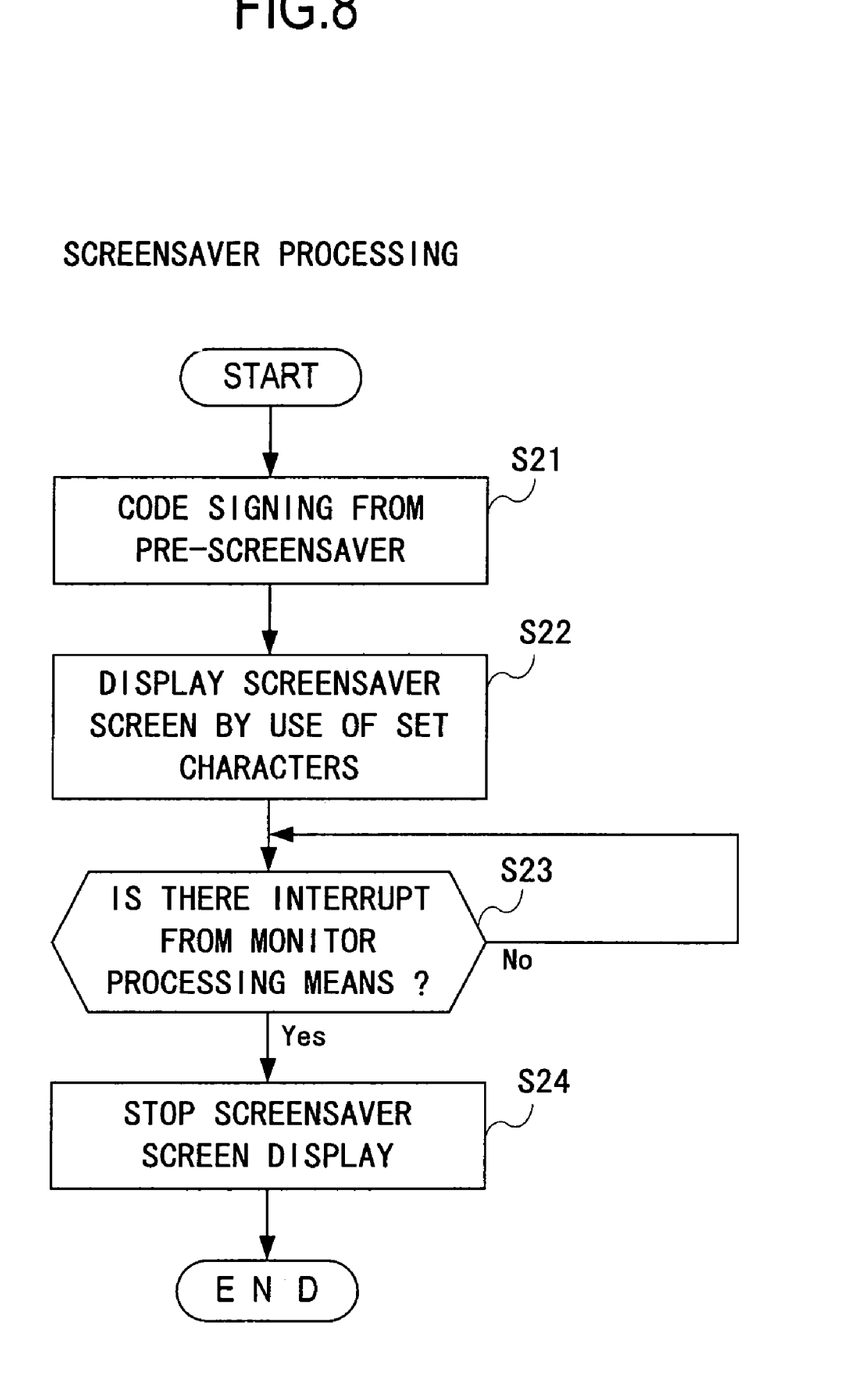
FIG. 8 is a flowchart of screensaver processing.

There will be described screensaver processing in the screensaver realized by the execution of the control section 11 with reference to FIG. 8. FIG. 8 is a flowchart of the screensaver processing.

The screensaver is started by the pre-screensaver, and the code signing is performed from the pre-screensaver (S21).

In the code signing, an encryption key is held in the screensaver, and corresponding decryption key is held in the pre-screensaver. When the pre-screensaver issues a random number to the screensaver, the screensaver encrypts the random number with the encryption key to return the number to the pre-screensaver. Then, the pre-screensaver decodes the encrypted random number with the decryption key. When the issued random number agrees with the decoded random number, it is recognized that an appropriate screensaver is operating.

Here, when the issued random number does not agree with the decoded random number, it is judged that the appropriate screensaver is not operating. The screen of the screensaver is performed by use of the characters set by the pre-screensaver, and the screensaver screen is displayed by use of the default display characters, When the code signing is normally performed, the screensaver displays the screensaver screen by use of the set characters (S22).

Moreover, the screensaver monitors (judges) whether or not there is an interrupt from the monitor processing means (S23). This judgment processing S23 is repeated until there is the interrupt. This interrupt processing is generated by again inserting the IC card 3 into the card reader and writer 30.

When there is the interrupt from the monitor processing means (Yes), the screensaver screen display is stopped (S24), thereby ending the processing.

[Effects of Embodiment]

According to the present system and method, when the IC card 3 as a user authentication device is pulled out of the card reader and writer 30, to lock the screensaver, the preset character contents are selected with the shortcut key, and the selected character contents are displayed in the screensaver screen. Therefore, the user is specified, the user can inform people around the user of a destination and a personal computer status by use of a message property, and space and paper savings can be effectively realized.

Moreover, according to the present system and method, when the IC card 3 as the user authentication device is pulled out of the card reader and writer 30, to lock the screensaver, the "space" key as the specific key is pressed, the arbitrary characters can be input. The input character contents are displayed in the screensaver screen. Therefore, there is an effect that an arbitrary item such as the time to return to the office can be informed to people around the user.

It is to be noted that since the arbitrary characters are input to overwrite the specific characters set as the default value. Therefore, there is an effect that the input can be efficiently performed using the specific characters.

Furthermore, according to the present system and method, when the IC card 3 as the user authentication device is pulled out of the card reader and writer 30, to lock the screensaver, the "escape" key as the specific key is pressed, and the correspondence between the shortcut keys and the character contents can be referred to. Therefore, there is an effect that selection mistakes can be reduced in the character contents to be displayed in the screensaver screen.

In addition, according to the present system and method, the code signing is performed in the monitor processing means, the pre-screensaver, and the screensaver, and it is confirmed that the appropriate program is executed. Therefore, security can be improved.

Moreover, according to the present system and method, when the IC card 3 is inserted into the card reader and writer 30, to cancel the screensaver, it is judged whether or not the IC card is an IC card capable of canceling the screensaver. When the IC card is capable of canceling the screensaver, the password input screen is automatically displayed. Therefore, there is an effect that the screensaver can be smoothly cancelled.

The present invention is preferable for a screensaver displaying method and an information processing system in which the characters arbitrarily selected or input by the user can be displayed with a simple operation during the starting of the screensaver started when a user authentication device such as the IC card is pulled out, so that the third party can be easily informed of user's destination, time to return to the office, personal computer status and the like, and user's convenience can be improved.

What is claimed is:

1. A screensaver displaying method for displaying a screensaver in a display unit of a processing device to lock processing in the processing device, when connection to a user authentication device is not recognized, the method comprising:

displaying character contents corresponding to a preset key in a screensaver screen, when the preset key is input within a specific time after the connection to the user authentication device is not recognized, beforehand setting a plurality of sets of the keys and a corresponding character contents; and displaying display contents corresponding to the selected key in the screensaver screen, when any of the plurality of preset keys is selected within a specific time.

2. A screensaver displaying method for displaying a screensaver in a display unit of a processing device to lock processing in the processing device, when connection to a user authentication device is not recognized, the method comprising:

displaying a screen in which input of arbitrary characters is possible, when a preset specific key is input within a specific time after the connection to the user authentication device is not recognized; and displaying contents of the characters in a screensaver screen, when the input characters are defined in the screen.

3. The screensaver displaying method according to claim 2, further comprising:
displaying preset character contents in the screen in which the input of the arbitrary characters is possible; and
overwriting and inputting the input characters with respect to the displayed character contents to define the input characters.

4. The screensaver displaying method according to claim 1, further comprising:
judging from identification information of the user authentication device whether or not cancellation of a screensaver display is possible, when the connection to the user authentication device is recognized;
displaying a password input screen in a case where the cancellation is possible; and
canceling the screensaver display and resetting to the screen before the locking of the screensaver in the processing device, when an appropriate password is input.

5. The screensaver displaying method according to claim 1, further comprising:
judging from identification information of the user authentication device whether or not cancellation of a screensaver display is possible, when the connection to the user authentication device is recognized;
displaying a password input screen in a case where the cancellation is possible; and
canceling the screensaver display and resetting to the screen before the locking of the screensaver in the processing device, when an appropriate password is input.

6. The screensaver displaying method according to claim 2, further comprising:
judging from identification information of the user authentication device whether or not cancellation of a screensaver display is possible, when the connection to the user authentication device is recognized;
displaying a password input screen in a case where the cancellation is possible; and
canceling the screensaver display and resetting to the screen before the locking of the screensaver in the processing device, when an appropriate password is input.

7. The screensaver displaying method according to claim 3, further comprising:
judging from identification information of the user authentication device whether or not cancellation of a screensaver display is possible, when the connection to the user authentication device is recognized;
displaying a password input screen in a case where the cancellation is possible; and
canceling the screensaver display and resetting to the screen before the locking of the screensaver in the processing device, when an appropriate password is input.

8. An information processing system for monitoring a user authentication device, and displaying a screensaver in a display unit of a processing device to lock processing in the processing device, when connection to the user authentication device is not recognized,
the system comprising:
a control section in which a plurality of specific keys and character contents are associated and stored beforehand in a table and which displays the corresponding character contents in a screensaver screen of the display unit with reference to the table, when any of the specific keys is selected and input within a specific time after the connection to the user authentication device is not recognized.

9. The information processing system according to claim 8, wherein the control section:
predetermines the specific key for displaying a screen in which input of arbitrary characters is possible,
displays in the display unit the screen in which the input of the arbitrary characters is input, when the specific key is input within the specific time after the connection to the user authentication device is not recognized, and
displays contents of the characters in a screensaver screen, when the input characters are defined in the screen.

10. The information processing system according to claim 9, wherein the control section presets the character contents to be displayed and overwritten in the screen in which the input of the arbitrary characters is possible, and overwrites and inputs the input characters with respect to the character contents displayed in the screen to define the input characters.

11. The information processing system according to claim 8, wherein the control section:
judges from identification information of the user authentication device whether or not cancellation of a screensaver display is possible, when the connection to the user authentication device is recognized,
displays a password input screen in the display unit in a case where the cancellation is possible,
judges whether or not an input password is appropriate, and
cancels the screensaver display and resets to the screen before the locking of the screensaver in the processing device, when the password is appropriate.

12. The information processing system according to claim 9, wherein the control section:
judges from identification information of the user authentication device whether or not cancellation of a screensaver display is possible, when the connection to the user authentication device is recognized,
displays a password input screen in the display unit in a case where the cancellation is possible,
judges whether or not an input password is appropriate, and
cancels the screensaver display and resets to the screen before the locking of the screensaver in the processing device, when the password is appropriate.

13. The information processing system according to claim 10, wherein the control section:
judges from identification information of the user authentication device whether or not cancellation of a screensaver display is possible, when the connection to the user authentication device is recognized,
displays a password input screen in the display unit in a case where the cancellation is possible,
judges whether or not an input password is appropriate, and
cancels the screensaver display and resets to the screen before the locking of the screensaver in the processing device, when the password is appropriate.

* * * * *

UNITED STATES PATENT AND TRADEMARK OFFICE
CERTIFICATE OF CORRECTION

| | |
|---|---|
| PATENT NO. | : 7,596,768 B2 |
| APPLICATION NO. | : 11/347580 |
| DATED | : September 29, 2009 |
| INVENTOR(S) | : Keisuke Nakayama |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twenty-eighth Day of September, 2010

David J. Kappos
*Director of the United States Patent and Trademark Office*